(12) United States Patent
Barde

(10) Patent No.: US 10,153,527 B2
(45) Date of Patent: Dec. 11, 2018

(54) THREE-DIMENSIONAL CARBON FOAM-SUPPORTED ELECTRODE FOR METAL-AIR BATTERIES

(75) Inventor: Fanny Jeanne Julie Barde, Houwaart (BE)

(73) Assignee: TOYOTA MOTOR EUROPE, Brussels (BE)

( * ) Notice: Subject to any disclaimer, the term of this patent is extended or adjusted under 35 U.S.C. 154(b) by 333 days.

(21) Appl. No.: 14/386,463

(22) PCT Filed: Mar. 19, 2012

(86) PCT No.: PCT/EP2012/054824
§ 371 (c)(1),
(2), (4) Date: Nov. 6, 2014

(87) PCT Pub. No.: WO2013/139370
PCT Pub. Date: Sep. 26, 2013

(65) Prior Publication Data
US 2015/0093660 A1    Apr. 2, 2015

(51) Int. Cl.
*H01M 12/08*   (2006.01)
*H01M 4/04*    (2006.01)
(Continued)

(52) U.S. Cl.
CPC ......... *H01M 12/08* (2013.01); *H01M 4/0416* (2013.01); *H01M 4/0419* (2013.01); *H01M 4/13* (2013.01); *H01M 4/133* (2013.01); *H01M 4/134* (2013.01); *H01M 4/1393* (2013.01); *H01M 4/587* (2013.01); *H01M 12/06* (2013.01); *H01M 2004/027* (2013.01); *H01M 2004/028* (2013.01); *Y02E 60/128* (2013.01)

(58) Field of Classification Search
CPC ....... H01M 12/08; H01M 4/133; H01M 4/134
USPC ........................................................ 429/406
See application file for complete search history.

(56) References Cited

U.S. PATENT DOCUMENTS 3,121,050 A    2/1964  Ford
4,231,901 A  * 11/1980 Berbeco .................. H01B 1/24
                                                        206/523
(Continued)

FOREIGN PATENT DOCUMENTS

EP       2 278 655 A1    1/2011
KR    20140022735 A  *  2/2014 .............. H01M 4/88
(Continued)

OTHER PUBLICATIONS

Yang, Xin-Hui, "Preparation of mesocellular carbon foam and its application for lithium/oxygen battery", Electrochemistry Communications, Elsevier, Amsterdam, NL, vol. 11, No. 6, Jun. 1, 2009, pp. 1127-1130.*
(Continued)

*Primary Examiner* — Miriam Stagg
*Assistant Examiner* — Victoria H Lynch
(74) *Attorney, Agent, or Firm* — Oliff PLC

(57) ABSTRACT

The present invention describes an electrode material based on carbon foam impregnated with particulate carbon, and a method for preparing the electrode material. The electrode material may be used as a cathode active material in a metal-air/metal-oxygen battery, such as a lithium-air, sodium-air, magnesium-air, zinc-air, tin-air or silicon-air battery.

10 Claims, 12 Drawing Sheets

1: Metal-Air battery
2: Cathode current collector
3: Air cathode (impregnated with electrolyte)
4: Separator (impregnated with electrolyte)
5: Anode
6: Anode current collector

(51) Int. Cl.
*H01M 4/13* (2010.01)
*H01M 4/133* (2010.01)
*H01M 4/1393* (2010.01)
*H01M 12/06* (2006.01)
*H01M 4/134* (2010.01)
*H01M 4/587* (2010.01)
*H01M 4/02* (2006.01)

(56) References Cited

U.S. PATENT DOCUMENTS

| | | | |
|---|---|---|---|
| 4,276,246 A | 6/1981 | Bonzom et al. | |
| 4,832,870 A * | 5/1989 | Clough | C04B 38/0022 252/500 |
| 5,626,977 A * | 5/1997 | Mayer | H01G 11/34 252/502 |
| 6,261,485 B1 | 7/2001 | Klett | |
| 6,899,970 B1 * | 5/2005 | Rogers | C01B 31/02 264/42 |
| 7,282,295 B2 | 10/2007 | Visco et al. | |
| 7,491,458 B2 | 2/2009 | Visco et al. | |
| 7,527,855 B2 | 5/2009 | Miller et al. | |
| 2008/0145755 A1 * | 6/2008 | Iacovangelo | H01M 4/364 429/188 |
| 2009/0291368 A1 * | 11/2009 | Newman | H01M 4/29 429/245 |
| 2010/0266907 A1 | 10/2010 | Yazami | |
| 2011/0059355 A1 * | 3/2011 | Zhang | H01M 4/8647 429/188 |
| 2012/0074908 A1 * | 3/2012 | Rolison | H01M 12/06 320/127 |
| 2013/0183511 A1 * | 7/2013 | Dai | B82Y 30/00 428/220 |
| 2013/0323610 A1 * | 12/2013 | Kim | H01M 4/8673 429/406 |
| 2014/0356737 A1 * | 12/2014 | Song | H01M 12/08 429/405 |

FOREIGN PATENT DOCUMENTS

| | | |
|---|---|---|
| WO | 00/16418 A1 | 3/2000 |
| WO | 2006/047033 A2 | 5/2006 |

OTHER PUBLICATIONS

Machine Translation KR20140022735A (Year: 2014).*
Shanmukaraj et al., "Boron Esters as Tunable Anion Carriers for Non-Aqueous Batteries Electrochemistry," vol. 132, pp. 3055-3062, issued in Journal of the American Chemical Society on Feb. 15, 2010.
Kamaya et al., "A Lithium Superionic Conductor," vol. 10, pp. 682-686, issued in Nature Materials on Jul. 31, 2011.

* cited by examiner

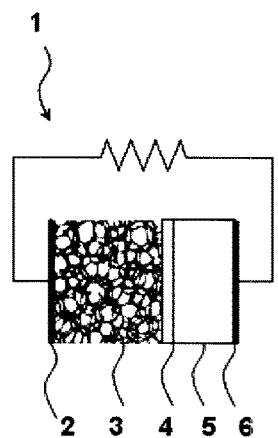
1: Metal-Air battery
2: Cathode current collector
3: Air cathode (impregnated with electrolyte)
4: Separator (impregnated with electrolyte)
5: Anode
6: Anode current collector
FIG. 1
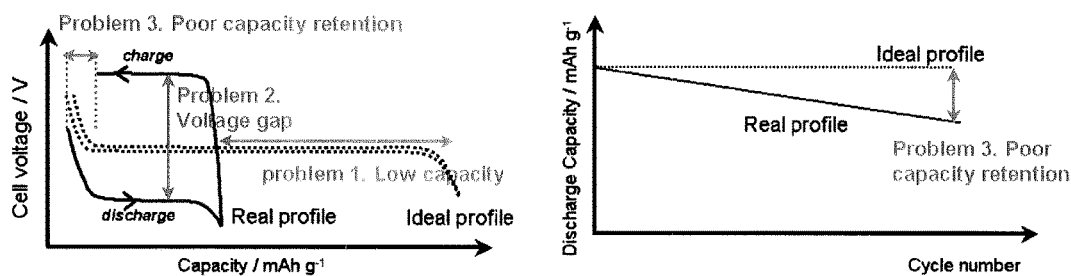
FIG.2
FIG.3

THREE-DIMENSIONAL CARBON FOAM-SUPPORTED ELECTRODE FOR METAL-AIR BATTERIES

The present invention relates to primary and rechargeable metal-air/metal-oxygen batteries. The invention describes an electrode material based on carbon foam impregnated with particulate carbon. The electrode material may be used as a cathode active material in a metal-air/metal-oxygen battery, such as a lithium-air, sodium-air, magnesium-air, zinc-air, tin-air or silicon-air battery.

BACKGROUND OF THE INVENTION

In recent years, with the rapid spread of information-related devices and communication devices such as personal computers, camcorders and cellular phones, it has become important to develop a battery for use as a power source for such devices. In the automobile industry, the development of high-power and high-capacity batteries for electric vehicles and hybrid vehicles has been promoted. Among various kinds of batteries, rechargeable lithium batteries have attracted attention due to their high energy density and high power.

Especially, rechargeable lithium-air batteries have attracted attention as a rechargeable lithium battery for electric vehicles and hybrid vehicles, which is required to have high energy density. Rechargeable lithium-air batteries use oxygen in the air as a cathode active material. Therefore, compared to conventional lithium rechargeable batteries containing a transition metal oxide (e.g., lithium cobaltate) as a cathode active material, rechargeable lithium-air batteries are able to have larger capacity.

In metal-air batteries, the cathode active material, oxygen, is not contained within the battery. Instead, this material is provided by the surrounding atmosphere. Naturally, such a system allows in principle a very high specific energy (energy provided by the battery per unit weight, typically given in Wh/kg in this technical field). In such batteries, oxygen may be partially reduced to peroxide, or fully reduced to hydroxide or oxide depending on the catalyst, electrolyte, availability of oxygen etc. When the negative electrode (anode) is lithium (Li), lithium peroxide ($Li_2O_2$) or lithium oxide ($Li_2O$) may be formed.

A metal-air battery may be schematically represented in FIG. 1. It contains mainly the following parts:
- metal anode (preferentially Li),
- non-aqueous electrolyte,
- air cathode (preferentially $O_2$ cathode) most commonly and usually preferably based on carbon (but other cathode materials are known in this context), binder and sometimes catalyst.

The ideal reactions during the use of such a battery should be as follows:
Upon discharge:
  At anode: $Li \rightarrow Li^+ + e^-$
  At air cathode: $2 Li^+ + x/2\ O_2 + 2e^- \rightarrow Li_2O_x$
Upon charge:
  At anode: $Li^+ + e^- \rightarrow Li$
  At air cathode: $Li_2O_x \rightarrow 2 Li^+ + x/2\ O_2 + 2e^-$ In the reaction which occurs in the air cathode upon discharge, the lithium ion ($Li^+$) is dissolved from the anode by electrochemical oxidation and transferred to the air cathode through an electrolyte. The oxygen ($O_2$) is supplied to the air cathode.

Nevertheless, during electrochemical processes of the battery, it can happen that the $O_2$ or $O_2$-derived species react with the solvent molecules of the electrolyte, which may lead to the formation of side reaction products such as $Li_2CO_3$, Li formate, Li acetate etc. These products are not desirable in the battery and are believed to reduce the metal-air battery performance.

These side-reactions may lead to poor re-chargeability of the system and poor capacity retention. These general problems may be illustrated schematically as shown in FIGS. 2, 3 and 4.

The problems shown schematically in FIGS. 2, 3 and 4 may be summarized as follows:
- Problem 1: Low initial capacity. This is a problem for both primary and secondary (rechargeable) metal-air non-aqueous batteries.
- Problem 2: Low efficiency of system, characterized by a large voltage gap between charge and discharge voltages. This is only an issue for secondary metal-air non-aqueous batteries subjected to charging and discharging cycles.
- Problem 3: Poor capacity retention, which leads to bad cyclability of the system and a low number of cycles because the capacity drops rapidly. This also is only an issue for secondary metal-air non-aqueous batteries.
- Problem 4: The reaction process is slow and charge/discharge performances at high current are lower.

In the case of a primary metal-air battery, only problems 1 and 4 are relevant.

Concerning the air cathode, in a conventional lithium-air battery, the air cathode often includes a metal grid (made from nickel, aluminium, stainless steel, or titanium for example) as an air cathode current collector, upon which an air cathode material is supported, the air cathode material comprising a conductive material such as particulate carbon. In an alternative embodiment described in EP 2 278 655 A1, carbon paper is used as an air cathode current collector. However, at higher currents (100 µA for example), the battery capacity decreases strongly and the hysteresis increases strongly (due to a combination of a lower discharge potential and a higher charge potential). Problems 1, 2, and 4 of those set out above thus remain to be solved.

In WO 00/16418, a lithium ion battery, which is a closed battery system, is disclosed which contains at least two carbon foam electrodes. Lithium air batteries containing carbon foam-based electrodes are not taught in this reference, and no means for modifying carbon foam substrates are disclosed.

SUMMARY OF THE INVENTION

In one aspect, the present invention relates to a metal-air battery comprising:
  a negative electrode containing a negative-electrode active material;
  a positive electrode using oxygen as a positive-electrode active material; and
  an electrolyte medium arranged between the negative electrode and the positive electrode;
  wherein the positive electrode contains carbon foam impregnated with particulate carbon.

In one aspect, the present invention relates to a method for preparing an electrode material, comprising the steps of:
  (a) suspending particulate carbon, a binder and optionally a catalyst in a solvent to form a slurry;
  (b) bringing a carbon foam substrate into contact with the slurry produced in step (a) so as to allow inclusion of the slurry into the carbon foam substrate;

(c) removing the carbon foam substrate impregnated with particulate carbon as obtained in step (b) from bulk slurry;

(d) drying the impregnated carbon foam substrate obtained in step (c) to remove solvent.

The present invention also relates to an electrode material as prepared by the above method. In a further aspect, the invention also relates to the use of such an electrode material in a Li-air, Mg-air, Na-air, Zn-air, tin-air or silicon-air battery.

In the present invention, the preferred quantities and amounts of components of, on the one hand, the electrode material of the present invention and, on the other hand, of the metal-air battery of the present invention are the same where the same components are concerned. Carbon foams, particulate carbons, binders, electrolyte solvents and salts, and other components set out herein as being preferred in the metal-air battery of the present invention are similarly preferred materials, in the amounts stated, in the electrode material of the present invention and vice versa.

BRIEF DESCRIPTION OF THE FIGURES

FIG. 1 is a general schematic diagram of a metal-air battery.

FIGS. 2 and 3 are schematic representations of problems to be addressed in metal-air batteries.

DETAILED DESCRIPTION OF THE INVENTION

Figure 4:
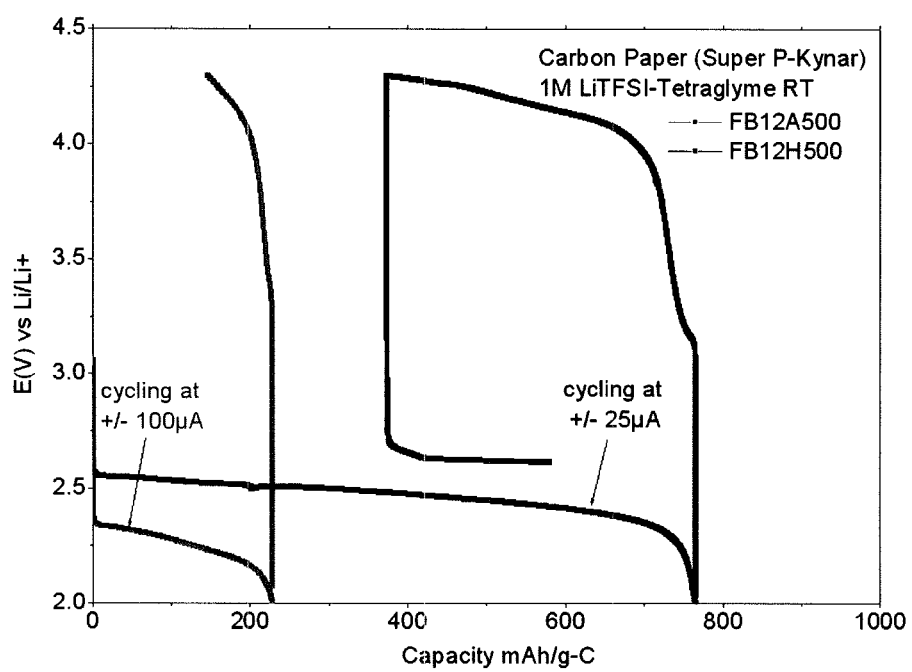
FIG. 4 illustrates the problem no 4 as set out above, encountered with a conventional lithium-air battery using a carbon paper-based cathode current collector.
Figure 5:
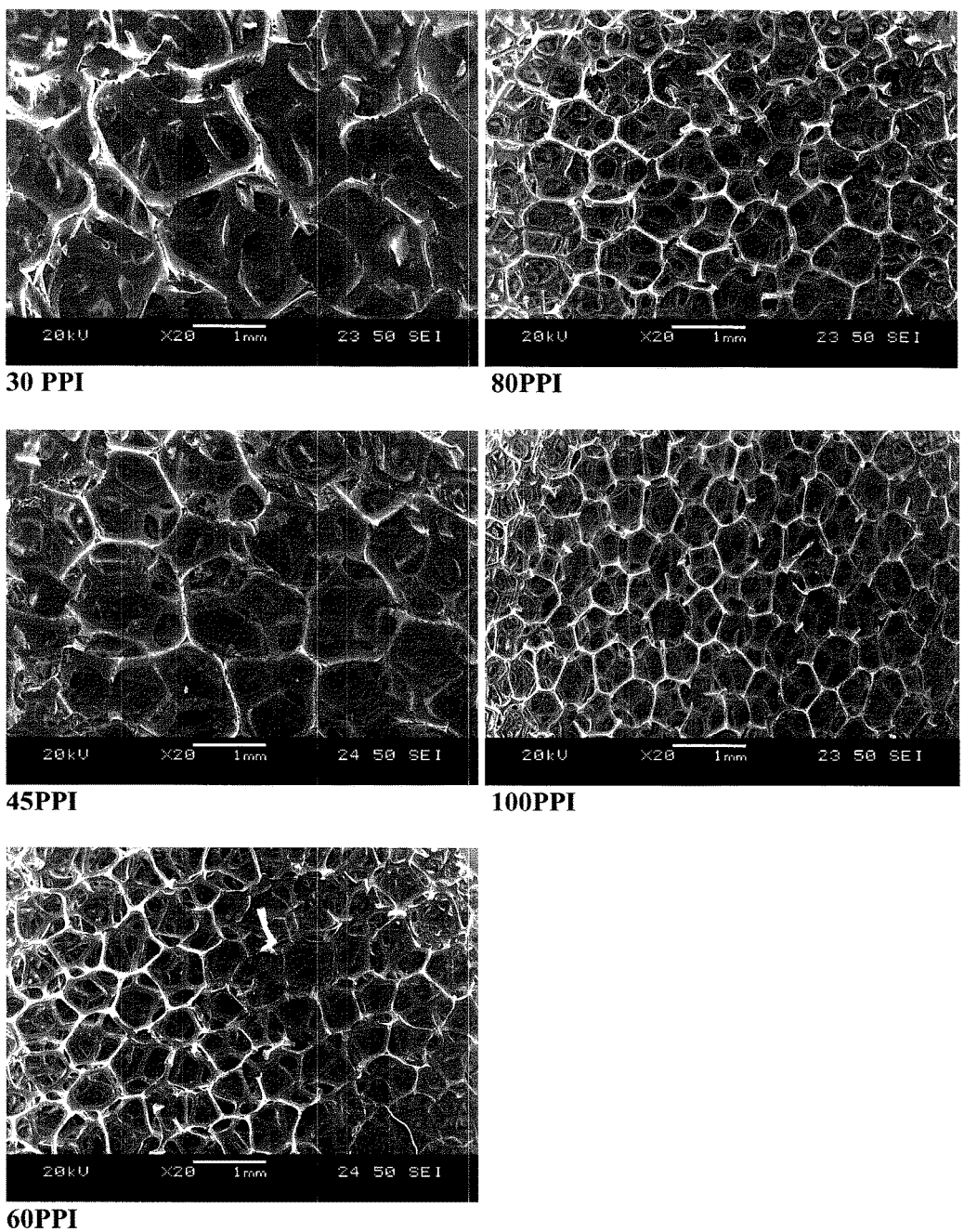
FIG. 5 shows Scanning Electron Microscope (SEM) images of as-received carbon foams of various porosities.

The present invention relates inter alia to an electrode material comprising carbon foam impregnated with particulate carbon. Such electrode materials can be used, for example, as cathode active materials in metal-air batteries such as Li-air, Na-air, Mg-air, Zn-air, Sn-air and Si-air batteries. In a metal-air battery of the present invention, such as a lithium-air battery, the negative electrode (which may also be referred to as "anode" hereinafter) comprises at least an anode active material (which may also be referred to as "negative electrode active material" hereinafter). As the anode active material, general anode active materials for metal batteries such as lithium batteries can be used and the anode active material is not particularly limited. In general, the anode active material is able to store/release a metal ion ($Li^+$, $Na^+$, $K^+$ ... ), $Li^+$ ions being present in Li-air batteries, $Na^+$ ions in Na-air batteries etc. Specific anode active materials are, for example, metals such as Li, Na, Mg, K, Al, Ca, Zn, Fe, Sn, Si, alloys, oxides and nitrides of the metals, and carbonaceous materials.

Specific anode active materials for rechargeable lithium-air batteries are, for example, a lithium metal, lithium protected anodes, lithium alloys such as a lithium-aluminum alloy, a lithium-tin alloy, a lithium-lead alloy and a lithium-silicon alloy, metal oxides such as a tin oxide, a silicon oxide, a lithium-titanium oxide, a niobium oxide and a tungsten oxide, metal sulfides such as a tin sulfide and titanium sulfide, metal nitrides such as a lithium-cobalt nitride, a lithium-iron nitride and a lithium manganese nitride, and carbonaceous materials such as graphite. Of these, lithium metal is preferred.

By "lithium-protected anode", reference is made here for example (but is not limited to) to a "Lithium Protected Electrode" (LPE) as described by Visco et al. (Polyplus). Usually the Li is covered by a solid electrolyte (for example LISICON with formulae $LiM_2(PO_4)_3$). Between the LiSiCON and the Li metal, there is usually an interlayer (for example consisting of $Cu_3N/Li_3N$). In LPE systems, Li metal can be attached directly to one side of LiSiCON material, or alternatively a small amount of solvent containing a Li salt electrolyte may be added between the LiSiCON material and the Li metal to ensure Li ionic conductivity. Such materials have been described in, for example, U.S. Pat. Nos. 7,282,295, 7,491,458. LiSiCON materials have also been described in Nature Materials, 10, 682-686 (2011).

When a metal, alloy or the like in the form of foil or metal is used as the anode active material, it can be used as the anode itself.

The anode is required to contain at least an anode active material; however, as needed, it can contain a binder for fixing the anode active material. The type and usage of the binder are the same as those of the air cathode described hereinafter, so that they will not be described here.

In general, an anode collector is connected to the anode, which collects current from the anode. The material for the anode collector and the shape of the same are not particularly limited. Examples of the material for the anode collector include stainless steel, copper, nickel, carbon and the like. Examples of the form of the anode collector include a foil form, a plate form and a mesh (grid) form.

In the metal-air, e.g. lithium-air, battery of the present invention, the positive electrode uses oxygen as a positive-electrode active material. Oxygen serving as the positive-electrode active material may be contained in air or oxygen gas.

In the metal-air, e.g. lithium-air, battery of the present invention, the positive electrode may be prepared by impregnating carbon foam with particulate carbon.

Carbon foam is a low-density material which may typically have a relative density of as little as 3 or 4% (i.e. 3 or 4 $g/cm^3$). Relative density for carbon foam is defined as the density of foam divided by the density of the solid parent material of the struts. In other words, it is the mass of real material in a block of foam compared to what it would be if it were a solid block of the same material. Typical relative densities for Duocel® foams run from about 2% to 15% depending on the material being foamed and the application. Due to the physics of small-scale structures, the majority of Duocel® foams are manufactured in the 3-10% density range. Actual foam density may be calculated as (parent density×relative density=foam density). To find relative density one may use (foam density/ parent density=relative density).

In an exemplary, but not limiting, embodiment of the present invention, the initial carbon foam, i.e. before slurry deposition, has 3% to 4% relative density to its parent material and thus has 96 to 97% void volume or porosity.

Carbon foam is available in various grades, which vary for example by the level of porosity, typically measured for carbon foam using the ppi (pores per inch). The ppi values can in an approximate manner, be converted into pore size diameters as follows: 100 ppi→around 250 µm pore size diameter, 80 ppi→around 315 µm, 60 ppi→around 416 µm, 45 ppi→around 555 µm, 30 ppi→around 830 µm, 10 ppi→around 2500 µm.

In a preferred electrode material according to the present invention, the carbon foam has a bulk density of 0.01 to 0.9 g/cm$^3$, preferably 0.02 to 0.5, more preferably 0.04 to 0.2, and most preferably 0.04 to 0.1 g/cm$^3$.

In a preferred electrode material according to the present invention, the carbon foam has a porosity of at least 5 ppi, preferably at least 50 ppi, more preferably at least 80 ppi.

The first prepared reticulated vitreous carbon foams were prepared by pyrolysis of thermosetting polymer [W. Ford, U.S. Pat. No. 3,121,050, 1964]. Then, Oak Ridge National laboratory developed a novel method for the synthesis of carbon foams using mesophase pitch or isotropic pitch as a precursor [J. W. Klett, U.S. Pat. No. 6,261,485, 2001]. Later, various methods were developed to prepare carbon foams with various properties. Carbon foams could be obtained which were either thermal insulators or thermally conductive materials. Carbon foams could show unsatisfactory mechanical properties, which limit their applications. Consequently some researchers have developed carbon foams with high compressive strength/density ratio [D. J. Miller, WO 047033, 2006] for use in various applications (as composites etc.). Further, certain foams may be converted to carbon and graphite foams by a process of oxidation to render their surface infusible followed by carbonization and, if desired, graphitization. [U.S. Pat. No. 4,276,246, 1981, Bonzom et al.]. U.S. Pat. No. 7,527,855 B2 (Miller et al.) provides a summary of carbon foam technology with many citations of documents relating to carbon foams from 1964 until 2005.

Carbon foam is a material which may be electronically conductive as well as mechanically strong enough to allow assembly of cells and batteries. In favourable embodiments, an acceptable compromise between a good mechanical properties and not too high weight is required. In terms of electrical conductivity, the initial carbon foam conductivity (measured prior to impregnation with particulate carbon and/or electrolyte) should preferably be greater than $10^{-6}$ ohm/cm, more preferably greater than $10^{-5}$ ohm/cm, and even more preferably equal to or greater than $10^{-4}$ ohm/cm.

In preferred embodiments, carbon foam used in the present invention will be as chemically inert as possible. For example, Duocel® RVC is highly resistant to intercalation by materials which disintegrate graphite. Duocel® RVC is inert to a wide range of very reactive acids, bases, and organic solvents. The carbonized foam is in the form of a vitreous, disordered or glassy carbon, which is useful for applications where there is a risk of corrosion. Compared to an aluminum foam (such as those distributed by ERG Aerospace), such a carbon foam is expected to be much more resistant to corrosion in battery applications according to the present invention. It may also be noted that, compared to classical metal foam (for example, Ni foam typically used in Ni—MH battery, or aluminum foam) carbon foam is cheaper (the average price being 1$ per cubic inch for carbon foam compared to 2-500$ per cubic inch for aluminum foam) and lighter.

In preferred embodiments of the present invention, the carbon foam is a reticulated vitreous carbon foam. In other words the carbon foam used is in a form of vitreous, disordered or glassy carbon. Other carbon foam types can however be used in the framework of the present invention.

Currently available commercial carbon foam materials that may be used to carry out the present invention include Duocel® products from ERG-Aerospace Corporation, and products from Ultramet.

Carbon foam can be produced in any shape. For example, the carbon foam may be: rectangular, tubular, conic, square, circular, cylindrical, a disk. The shape used will depend on the cell/battery design requirements.

An electrode, such as an air cathode, based on carbon foam shows an interconnected network of pores and the shape of the pores is not restricted in the present invention. Such an electrode material can be impregnated with electrolyte. Thus the so-called "electrolyte compartment" (no 4 in FIG. 1) is no longer only limited to the electrolyte compartment where the separator is usually the main component, but also extends to the air cathode compartment (no 3 in FIG. 1).

It is believed by the present inventor that the three-dimensional porosity of the carbon foam-based cathode can allow gas diffusion channels, especially allowing $O_2$ to diffuse in the cell. It is also believed that thanks to its three-dimensional network of pores, the three-dimensional carbon foam allows electrolyte to penetrate throughout the cathode. Wettability is increased, and therefore access of $O_2$ to the reaction sites. The capacity is thus increased. It is further demonstrated (cf. FIG. 6) that an advantage of carbon foam comes from the fact that even after the loading of carbon, the porosity of the air cathode is still available. Electrolyte may therefore still circulate in the pores after loading of the slurry. Finally, it is believed that the $Li_2O_x$ discharge products may be stored within these pores.

In the present invention, an electrode that may be used as the positive electrode material may be prepared by impregnating a carbon foam substrate, which may be cut to an appropriate size and shape, with particulate carbon. The impregnation process typically involves the use of a solvent to produce a slurry in which the particulate carbon is dispersed. In this dispersion, the particulate carbon may be accompanied by binder (e.g. a suitable polymer) as well as optional catalyst material. The carbon foam substrate may be dipped in the particulate carbon-containing slurry, leading to impregnation (loading) of the carbon foam substrate with particulate carbon.

Since the carbon foam has a three-dimensional structure, it proved possible to load much more carbon on a carbon foam substrate than on carbon paper. For example, up to 18 mg of carbon could be loaded on a disk of 12 mm diameter carbon foam with a thickness of 6 mm. This was a result observed experimentally on test disks of this size, as will be set forth in more detail in the experimental section below, but the dimensions of the carbon foam substrate can be varied freely. This may be compared to a conventional maximum loading of about 1 mg of carbon for a 12 mm diameter carbon paper with a thickness of around 1 mm.

Particulate carbon used in the present invention may include carbon blacks, such as Ketjen Black, acetylene black, channel black, furnace black, lamp black, and thermal black; graphite, such as natural graphite, e.g., scaly graphite, artificial graphite, and expanded graphite; activated carbon from charcoal and coal; carbon fibers obtained by carbonizing synthetic fibers and petroleum pitch-based materials; carbon nanofibers; and tubular carbon, such as carbon nanotubes. Modified carbons such as N-doped carbon may also be used. Graphene may also be used.

In the present invention, the particulate carbon used is preferably a porous material in the form of a powder and preferably has a high specific surface area of 20 to 2000 $m^2/g$, preferably 60 to 2000 $m^2/g$ and most preferably 60 to 1500 $m^2/g$. For example, carbon may be used upon which a treatment is performed by a general method to increase porosity or surface area, followed by another treatment to increase the wettability. Examples of commercial carbon products which can be used in the present invention include the KS series, SFG series, Super P series and Super S series available from TIMCAL Ltd., activated carbon products available from Norit, Black Pearl and AB-Vulcan 72 available from Cabot, and KB-ECP and KB-ECP600JD available from KB International. Other examples of commercially available carbon include the WAC powder series available from Xiamen All Carbon Corporation, PW15-type, J-type and S-type Activated Carbons available from Kureha, and Maxsorb MSP-15 available from Kansai Netsu Kagaku.

Examples of the method for increasing the porosity, surface area and wettability of the particulate carbon include physical activation or chemical activation. The chemical activation method includes, for example, immersing the carbon material in a strong alkaline aqueous solution (potassium hydroxide solution for example), in an acid solution (nitric acid or phosphoric acid for example) or in a salt (zinc chloride for example). This treatment can be followed (but not necessarily) by a calcination step at relatively low temperature (450° C. to 900° C. for example).

In the present invention, it is possible to use, for example, carbon black treated/activated by stirring it in concentrated $HNO_3$ for 3 days at room temperature. During the treatment/activation, the amount of acid versus carbon depends on the nature of the carbon and is preferably chosen to yield a slurry which is liquid enough to be stirred by means of a magnetic stirrer, etc. $HNO_3$ is preferable because it has an oxidizing effect on the carbon surface which affords polar groups on the surface that improves wettability. The carbon is then filtrated and washed with deionized water until a neutral pH of the solution is obtained. In this case, it is not necessary to apply a post calcination step.

In addition, the particulate carbon preferably has pores having a pore diameter of 5 nm or more, preferably 20 nm or more. The specific surface area of the carbon and the pore size can be measured by the BET method or the BJH method, for example. Furthermore, in general, the carbon preferably has an average particle diameter (primary particle diameter) of 8 to 350 nm, more preferably 30 to 50 nm. The average primary particle diameter of the carbon can be measured by TEM.

The particulate carbon used in the present invention may show any one of the above-mentioned preferred ranges for specific surface area, pore diameter or particle diameter. Preferred particulate carbon in the framework of the invention includes carbon showing a preferred range for just one of these types of physical feature, or carbon showing preferred ranges for two of the features, or carbon showing preferred ranges for each of the three features of specific surface area, pore diameter or particle diameter.

Among forms of particulate carbon that are advantageous in the present invention are: Super P® Li (Timcal) showing a particle size of 40 nm and a specific surface area (determined by the Brunauer Emmet & Teller method) of 62 $m^2/g$; Black Pearl® 2000 (from Cabot Corporation) showing a particle size of 12 nm and a Specific Surface Area (determined by the Brunauer Emmet & Teller method) of 1487 $m^2/g$; Ketjen Black® EC-600JD (from AzkoNobel) showing a specific surface area (determined by the Brunauer Emmet & Teller method) of 1400 $m^2/g$.

In the present invention, it is considered that a higher specific surface area and pore volume of particulate carbon will increase battery performance.

In a preferred electrode material of the present invention, the particulate carbon has a specific surface area of between 20 and 2000 $m^2/g$ and/or an average primary particle diameter of 8 to 350 nm. In a further preferred embodiment, the amount of particulate carbon expressed with respect to the volume of carbon foam is between 5 and 25 mg carbon/$cm^3$ of carbon foam, preferably from 10 to 25 mg/$cm^3$, more preferably from 15 to 25 mg/$cm^3$, and most preferably from 17 to 22 mg/$cm^3$.

Thanks to the use of carbon foam current collector/air cathode supported onto carbon foam, the performances of the metal air battery are better than when a classical current collector (such as carbon paper) is used, in particular:

Better performances (higher voltage) at higher rates (as illustrated by the experimental results shown in FIGS. 10, 11, 13) (the rate here is the speed at which the battery is charged or discharged)

Figure 12:
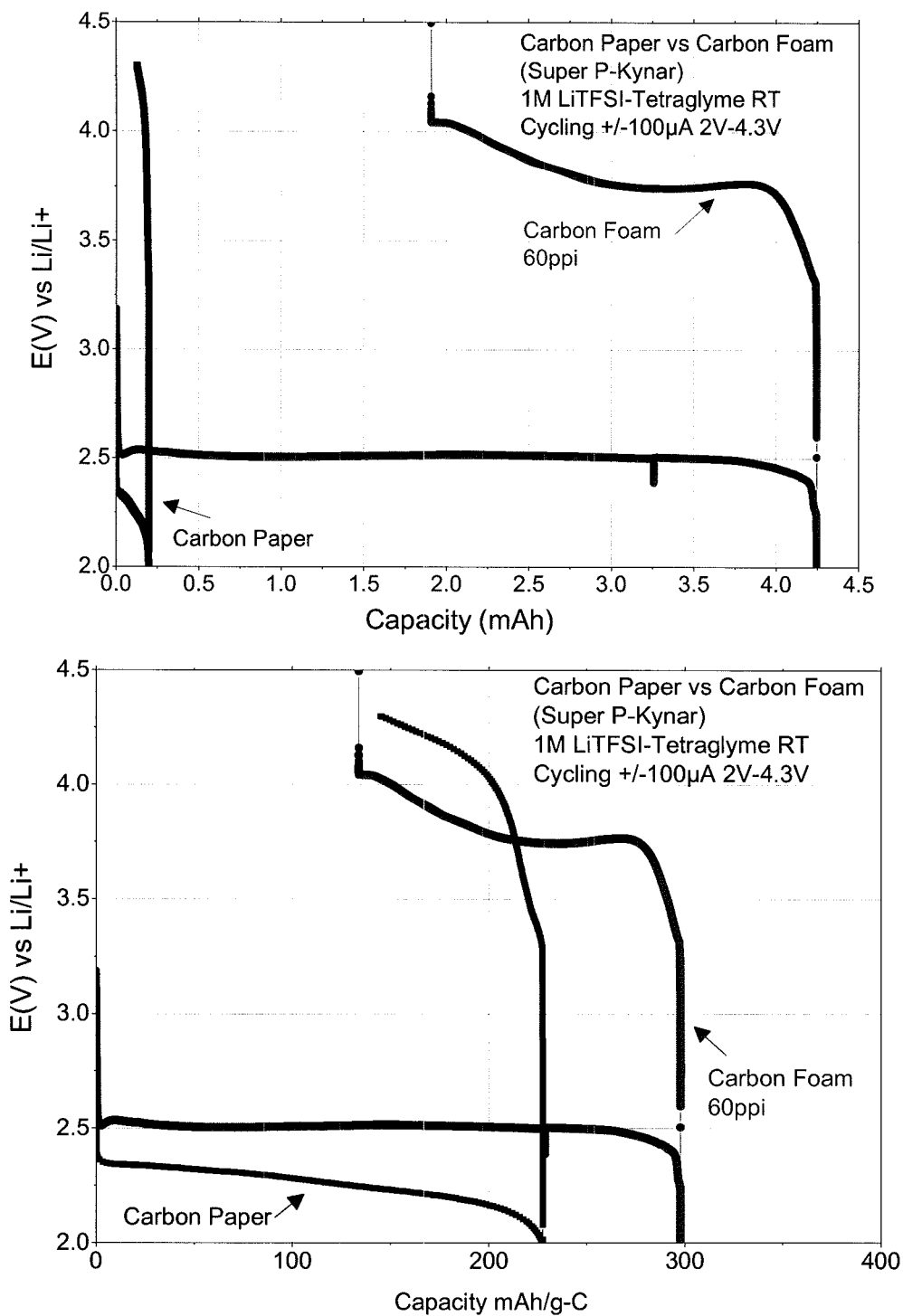
Figure 14:
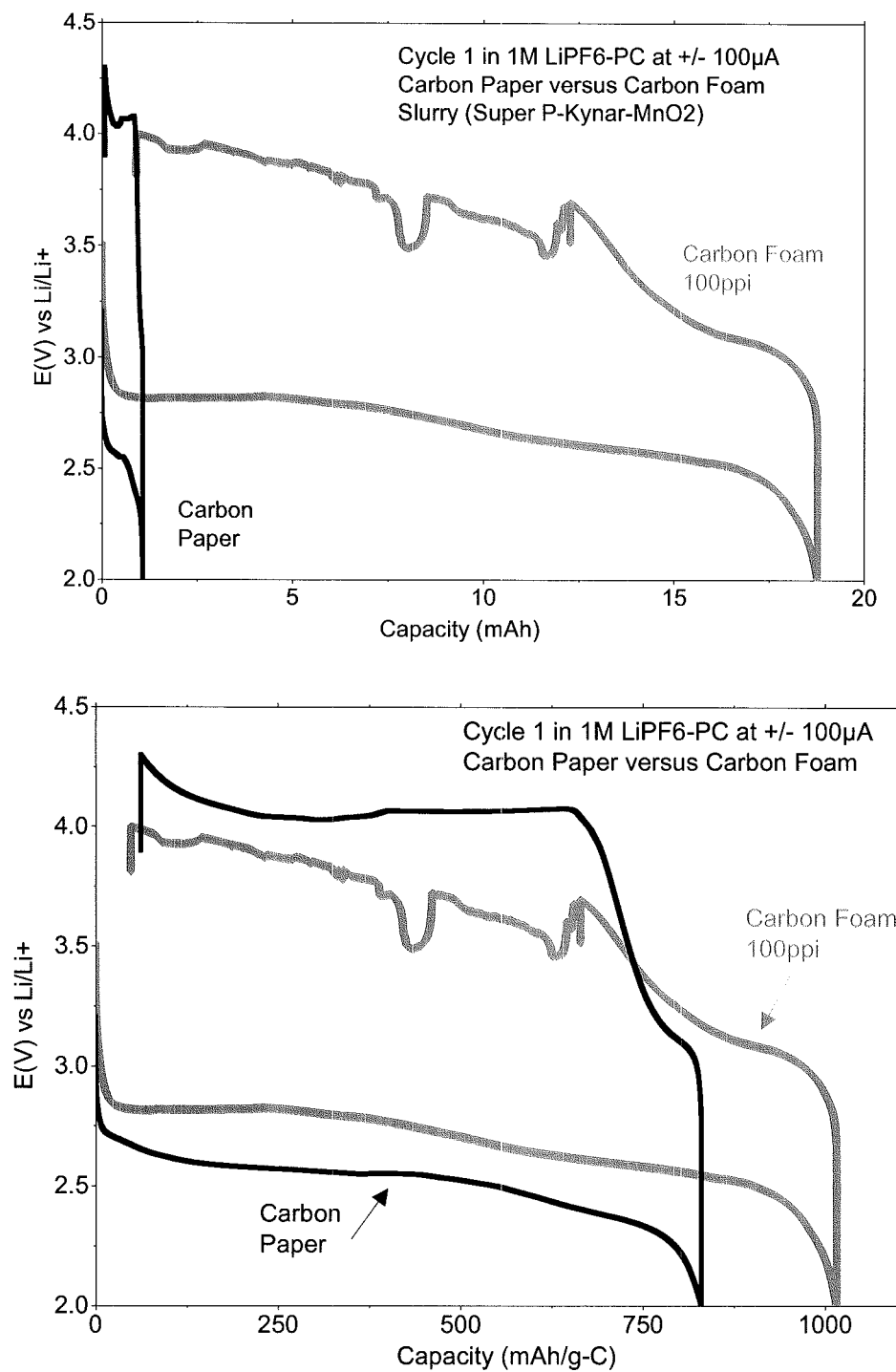

A lower hysteresis observed when the same current is applied (as illustrated by the experimental results shown in FIGS. 12, 14)

Higher overall capacity since the amount of carbon/$cm^2$ is higher.

In metal-air batteries such as lithium-air batteries, a catalyst is commonly added to the cathode. The use of a catalyst is not absolutely essential for a metal-air battery to fulfill its function but a catalyst may have positive effects e.g. for a lithium-air battery, a catalyst may help the $Li_2O_x$ decomposition during the charging/oxidation process.

In a preferred embodiment therefore, the positive electrode has a catalyst content of 0.01% to 60% by weight, preferably 55% by weight or less, and more preferably 0.01% to 50% by weight with respect to the total weight of the positive electrode. A preferred quantity of catalyst is from 0.1% to 30% by weight, preferably 1% to 25% by weight, and more preferably 2% to 20% by weight, or even more preferably 3% to 15% by weight with respect to the total weight of the positive electrode. At a catalyst content of 0.01% by weight or more, the effect of the catalyst is sufficiently exhibited. At a catalyst content of 60% by weight or more, the proportions of other components such as a conductive material and a binder incorporated in the positive electrode tend to be too low, thus giving rise to possible reductions in conductivity and mechanical strength. As regards the amount of catalyst with respect to the amount of particulate carbon (weight/weight), rather than as a percentage with respect to the positive electrode, the catalyst:particulate carbon ratio may vary widely, and in preferred embodiments from 0.01 to 2.0. Highly preferred catalyst:particulate carbon ratios (weight:weight) may be 0.15 or less.

Types of catalyst material that can be used in a metal-air e.g. lithium-air battery according to the present invention include: transition metal oxides such as $MnO_2$ in various forms, preferably α-type, $Co_3O_4$, $Fe_2O_3$, CuO, $LiCoO_2$, mixed transition metal oxides such as $NiFe_2O_4$, $CoFe_2O_4$, $MnFe_2O_4$, phthalocyanines such as Co phthalocyanine ($C_{36}H_{16}CoN_8$), metals or alloys (Mn, Co, Ru, Pt, Ag, CoMn, Au).

In the metal-air e.g. lithium-air battery of the present invention, the positive electrode may contain a conductive material, in addition to the carbon and non-carbon materials discussed above. Examples of such further conductive materials include conductive fibers such as metal fibers; metal powders, such as silver, nickel, aluminum powders; and organic conductive materials such as polyphenylene derivatives. These may be used separately or in combination as a mixture.

Moreover, the positive electrode may contain lithium oxide or lithium peroxide.

In the metal-air e.g. lithium-air battery of the present invention, the positive electrode may contain a binder. The binder is not particularly limited. The binder may be composed of a thermoplastic resin or a thermosetting resin. Examples thereof include polyethylene, polypropylene, polytetrafluoroethylene (PTFE), polyvinylidene fluoride (PVDF), styrene-butadiene rubber (SBR), carboxymethylcellulose sodium salt (CMC) or sodium carboxymethyl cellulose showing various molecular weights or carboxymethylcellulose sodium (CMC and the sodium salt being supplied commercially notably by Sigma-Aldrich). It may be noted that CMC and SBR can be used together. CMC is a thickening agent, so it can be used alone, but preferentially in combination with SBR for example.

Other binders that may appropriately be used in the invention include tetrafluoroethylene-hexafluoropropylene copolymers, tetrafluoroethylene-hexafluoropropylene copolymers (FEP), tetrafluoroethylene-perfluoroalkyl vinyl ether copolymers (PFA), vinylidene fluoride-hexafluoropropylene copolymers, vinylidene fluoride-chlorotrifluoroethylene copolymers, ethylene-tetrafluoroethylene copolymers (ETFE resins), polychlorotrifluoroethylene (PCTFE), vinylidene fluoride-pentafluoropropylene copolymers, propylene-tetrafluoroethylene copolymers, ethylene-chlorotrifluoroethylene copolymers (ECTFE), vinylidene fluoride-hexafluoropropylene-tetrafluoroethylene copolymers, vinylidene fluoride-perfluoromethyl vinyl ether-tetrafluoroethylene copolymers, and ethylene-acrylic acid copolymers. Copolymers having sulfonate group-terminated perfluorovinyl ether groups attached to a poly(tetrafluoroethylene) backbone, such as those commonly referred to as Nafion®, may also be envisaged as polymer binder materials in the present invention. Furthermore, LIQUION™ may be envisaged for use as a binder in the present invention. LIQUION is a dispersion of Nafion® in a mixture of water and alcohol. This product is manufactured by Ion Power Inc, from Nafion® polymer. It is available in a 5 wt % by weight solid or 15 wt %, low and high equivalent weight polymers. These materials may be used separately or in combination as a mixture.

In the electrode material and metal-air batteries of the present invention, during preparation of electrode material containing carbon foam impregnated with particulate carbon according to the method of the invention, the binder is considered to have the role of ensuring adhesion between, on the one hand, a slurry, prepared using particulate carbon, a binder and optionally a catalyst in suspension in a solvent, and, on the other hand, the carbon foam.

The relative weights of the binder or binders present to other solids, in particular to particulate carbon alone, or with respect to (particulate carbon+catalyst) may vary over a considerable range, for example between 0.001 to 2, preferably from 0.01 to 0.5 and more preferably from 0.01 to 0.25, still more preferably from 0.02 to 0.1. The weight of binder, in particular in the slurry used in the method of preparing an electrode material of the invention, may even thus be of the same order as the combined weights of (particulate carbon+catalyst), or even greater, but in preferred embodiments, the amount of binder may be as little as 1% or 2% of the weight of these other solids. For PVDF, a weight of binder which is approximately half that of the particulate carbon, or half the sum of the weight of particulate carbon+catalyst, can be used, but much smaller amounts can also be used. It is envisaged that for SBR used in combination with CMC, 1 wt % SBR+1 wt % CMC could typically be used, with respect to the weight of particulate carbon, or weight of (particulate carbon+catalyst) if a catalyst is present, which corresponds to a ratio of 0.02 of the combined mass of binder materials with respect to (particulate carbon+catalyst).

In the metal-air e.g. lithium-air battery of the present invention, the ion-conducting (electrolyte) medium arranged between the negative electrode and the positive electrode may be a non-aqueous or aqueous electrolytic solution containing water or one or more organic solvents and typically containing a salt. Non-limiting examples of the salt that can be used include known supporting electrolytes, such as inorganic lithium salts $LiPF_6$, $LiClO_4$, $LiAsF_6$, $LiBF_4$, and organic lithium salts such as $Li(CF_3SO_3)$, $LiN(CF_3SO_2)_2$, $LiN(C_2F_5SO_2)_2$ and $LiC(CF_3SO_2)_3$. These salts may be used separately or in combination. The concentration of the salt is preferably in the range of 0.1 to 2.0 M and more preferably 0.8 to 1.2 M.

Additives may be added to the electrolyte medium to enhance lithium ion dissolution, such as TPFPB (tris(pentafluorophenyl)borane) or crown ethers.

Ideally, solvents used in a lithium air battery will show as many as possible of the following properties: stability against $O_2$-derived radicals and other bases and nucleophiles (e.g. $O_2^{2-}$ and $Li_2O_2$), low viscosity, high conductivity, high oxygen solubility and diffusion coefficient, high solubility of ions (especially $Li^+$), a low vapor pressure avoiding too rapid evaporation in case of an open-battery system, reasonably low melting point, reasonably hydrophobic, allowing ideal product reaction, a good wettability of the cathode (and its components; various types of carbon, binder, catalyst etc.), good wettability of the separator and good wettability of other components of the battery, compatibility with an Li anode and reduction of problems associated with an Li anode (dendrite formation etc.), a large electrochemical window where the solvent is stable, and thermal stablity. Concerning melting point, although solvents which are liquid at room temperature (about 20° C.) are a preferred group of electrolyte solvents, it is envisaged that batteries according to the invention could be used at temperatures above room temperature. In addition, a solvent which is not liquid at room temperature, or at the temperature of use of the battery, could be used as part of the electrolyte medium in combination with another solvent which is liquid at room temperature, or at the temperature of use of the battery, such that the combination of solvent species is liquid at room temperature, or at the temperature of use of the battery.

Where the electrolyte medium of the lithium-air battery of the present invention is in the liquid phase, it is primarily constituted in mass terms by a continuous phase containing the liquid electrolyte solvent. The liquid electrolyte shows ionic conductivity (preferably Li+ ion conductivity).

The solvent used in the electrolyte medium of the metal-air e.g. lithium-air battery of the present invention can in principle be an aqueous or a non-aqueous organic solvent.

Non-aqueous solvents used in a metal-air e.g. lithium-air battery of the present invention may be freely chosen among aprotic organic solvents known for use in metal-air batteries such as lithium-air batteries. Examples of such aprotic organic solvents include cyclic carbonates, chain carbonates, cyclic esters, cyclic ethers, and chain ethers. Examples of cyclic carbonates include ethylene carbonate (EC), propylene carbonate (PC), butylene carbonate, and vinylene carbonate. Examples of chain carbonates include dimethyl carbonate (DMC), diethyl carbonate (DEC), and ethyl methyl carbonate (EMC). Examples of cyclic ester carbonates include γ-butyrolactone and γ-valerolactone. Examples of cyclic ethers include tetrahydrofuran (THF) and 2-methyltetrahydrofuran. Examples of chain ethers include dimethoxyethane (DME) and ethylene glycol dimethyl ether, triethylene glycol dimethyl ether (TEDGE), tetraethylene glycol dimethyl ether (TEDGE). These may be used separately or in combination as a mixture. Solvents from the sulfoxide family (R—SO—R'), for example dimethyl sulfoxide (DMSO), can be used as well. Nitrile solvents can also be used, such as acetonitrile, propionitrile, and 3-methoxypropionitrile. Linear amides, lactams, or ureas also constitute possible non-aqueous solvents used in a lithium battery of the present invention. Such linear amides, lactams, or ureas may include N,N-dimethylformamide; dimethylacetamide; N-methylpyrrolidone; tetra methyl urea; tetraethylurea.

An ionic liquid (IL) may be used in the electrolyte medium of the present invention, preferably a room temperature ionic liquid. Example of such ILs are N-methyl-N-propyl piperidinium bis (trifluoromethane sulfonyl) imide (PP13TFSI), Ethyl Methyl Imidazolium (Trifluoromethane sulfonyl) imide (EMI)TFSI, and mixtures thereof.

It may further be contemplated in the framework of the present invention to add an oxygen dissolution enhancer to the electrolyte medium. This oxygen dissolution enhancer may be a fluorinated polymer, a fluorinated ether, a fluorinated ester, a fluorinated carbonate, a fluorinated carbon material, a fluorinated blood substitute, or indeed a metalloprotein. Such oxygen dissolution enhancers are described in US 2010/0266907.

It may be beneficial to add to a Li-air battery solvent in the present invention a boron ester of general formula Y—C((CH$_2$O)Z$^1$O)(Z$^2$O))B, having some Lewis acidity properties which may help to dissolve partially or fully compounds like Li$_2$O$_2$ or Li$_2$O [cf. Shanmukaraj et al., JACS, 2010, 132, 3055-3062].

The present invention, in one aspect, relates to an electrode material containing carbon foam impregnated with particulate carbon, and a method for preparing the electrode material. Such an electrode material is not limited to use in metal-air batteries, but may find application in other types of batteries.

In the method of preparing an electrode material according to the present invention, a slurry may be prepared by suspending particulate carbon, a binder and optionally a catalyst in a solvent. The slurry is then brought into contact with a carbon foam (CF) substrate. One possibility here is "dipping process", where the CF substrate is introduced into the slurry. Another alternative is a "spraying process" where the slurry is sprayed onto the carbon foam. It may be noted that the carbon foam substrate may be dipped one or several times in the slurry. In many instances, it is envisaged that it will be preferable to dip the CF substrate only once in the slurry so as not to deposit an excessive amount of slurry. The number of times the CF is dipped in the slurry may however depend on the viscosity of the slurry. If the viscosity is low, it may be appropriate to dip the CF several times in the slurry. In case the slurry shows high viscosity, a single dipping may then be sufficient. Similarly, spraying of a CF substrate by slurry may be carried out in a single step, or repeated so as to obtain the required load of particulate carbon.

After the CF substrate has been impregnated with particulate carbon using a slurry, and the CF substrate has been removed from the bulk slurry, the impregnated CF substrate is dried. Drying may be carried out at room temperature. Drying by heating, or drying under reduced pressure are also possible. A combination of heating at reduced pressures (for example, 80° C. under vacuum) is also possible.

In the method of preparing an electrode material according to the present invention, the solvent used to prepare the slurry is not specially restricted. Generally appropriate solvents include ones selected from the group consisting of: acetone, alcohols such as ethanol, N-methyl-2-pyrrolidone (NMP), propylene carbonate (PC), N,N-dimethylformamide, tetrahydrofuran (THF), water. The boiling point of the solvent is preferably 200° C. or lower since drying is thereby facilitated.

In the method of preparing an electrode material according to the present invention, a preferred ratio of the mass of solvent to the total mass of dry particulate carbon, binder and catalyst if present, is 5 to 10. This ratio has been found to be appropriate for Super P carbon (SSA 60 m$^2$/g). However, if carbon is used having a higher SSA, for example around 1500 m$^2$/g, a different preferred ratio of the mass of solvent to the total mass of dry particulate carbon, binder and catalyst may be appropriate.

For mixing the slurry, several types of equipments might be appropriate. One can use a planetary centrifugal type mixer (e.g. a Thinky mixer) or a high-performance dispersing Instrument (IKA®) or other types of mixer.

It is preferable to carry out the method of preparing an electrode material according to the present invention so as to produce an amount of particulate carbon with respect to carbon foam in the range set out above in the discussion of the preferred metal-air battery of the present invention. A preferred amount of particulate carbon incorporated into the carbon form expressed with respect to the volume of carbon foam, is thus between 5 and 25 mg carbon/cm$^3$ of carbon foam, preferably from 10 to 25 mg/cm$^3$, more preferably from 15 to 25 mg/cm$^3$, and most preferably from 17 to 22 mg/cm$^3$. Since not all of the particulate carbon of a slurry brought into contact with the carbon foam substrate may actually be incorporated, the amount of particulate carbon brought into contact with a carbon foam substrate by combination of a slurry of a given volume and a carbon foam substrate may be higher than the maximum values of these ranges. The preferred carbon foam and particulate carbon characteristics (density, porosity, specific surface area, average primary particle diameter) in the method of preparing an electrode material according to the present invention are as previously set out for the metal-air battery of the present invention.

In the method of preparing an electrode material according to the present invention, in a preferred embodiment, in a further step (e), the dried impregnated carbon foam substrate obtained in step (d) of the method of the invention is brought into contact with a liquid electrolyte. Preferably, the liquid electrolyte contains a lithium salt. The solvent of the liquid electrolyte may be one of the above-referenced solvents that may used in the electrolyte medium of a metal-air e.g. lithium-air battery.

It is thought that the added liquid electrolyte may penetrate the remaining volume of the impregnated carbon foam, i.e. that part not already occupied by particulate carbon, binder and catalyst if present.

In the metal-air battery of the present invention, in a preferred embodiment, a cathode current collector, shown as element (2) in FIG. 1, will be present to connect the carbon foam-containing cathode electrode material (3) to the external circuit. The material for the air cathode current collector and the shape of the same are not particularly limited. Examples of the material for the air cathode current collector include stainless steel, aluminum, nickel, titanium and carbon. Examples of the form of the air cathode collector include a foil form, a plate form, a mesh (grid) form and a fibrous form. Preferably, the air cathode collector has a porous structure such as a mesh form since the collector having a porous structure has excellent efficiency of oxygen supply to the air cathode.

It is also possible that an air cathode may be provided as a single region, and may in particular contain carbon foam impregnated with particulate carbon prepared according to the present invention. Thus, with respect to FIG. 1, the separate cathode current collector element (2) might not be present. For example, an embodiment that may be envisaged is that only a part of the carbon foam of region (3) is impregnated with slurry containing particulate carbon and then with electrolyte i.e. only to a certain depth starting from the separator region (4). The outermost part of region (3), distant from the separator region (4), would thus be "dry", not containing particulate carbon nor impregnated with electrolyte, and this "dry" part of the carbon foam could be connected directly to an external circuit, so that a distinct cathode current collector element (2) would not necessarily be required.

In the metal-air e.g. lithium-air battery of the present invention, a separator may advantageously be provided between the air cathode and the anode for complete electrical insulation between these electrodes. The separator is not particularly limited as long as it is able to electrically insulate the air cathode and the anode from each other and has a structure that allows the electrolyte to be present between the air cathode and the anode.

Examples of the separator include porous films and non-woven fabrics comprising polyethylene, polypropylene, cellulose, polyvinylidene fluoride, glass ceramics, etc. Of these, a separator made of glass ceramics is preferred.

As the battery case for housing the metal-air battery of the present invention, general battery cases for metal-air batteries can be used. The shape of the battery case is not particularly limited as long as it can hold the above-mentioned air cathode, anode and electrolyte. Specific examples of the shape of the battery case include a coin shape, a flat plate shape, a cylindrical shape, a rectangular/prismatic shape and a laminate shape. It is possible for the battery of the present invention to be completely encased in an oxygen-permeable membrane, advantageously one which shows selectivity for oxygen diffusion over that of water.

The metal-air battery of the invention can discharge when an active material, which is oxygen, is supplied to the air cathode. Examples of oxygen supply source include the air and oxygen gas, and preferred is oxygen gas. The pressure of the supplied air or oxygen gas is not particularly limited and can be appropriately determined.

The shape of the metal-air battery of the present invention is not particularly limited. Examples thereof include coin shapes, button shapes, sheet shapes, rectangular/prismatic shapes and laminate shapes. The lithium-air battery may have large shapes for use in electric cars and the like.

The metal-air battery of the present invention may be used as a primary battery or a rechargeable secondary battery.

The metal-air battery of the present invention may, for example, be put to practical use in a process wherein the battery is cycled between certain limits defined by initial and final voltage, or initial and final capacity or specific capacity. For example, one process for using a lithium-air battery of the present invention may consist of a process wherein:

(a) the lithium-air battery is provided in a fully charged state;

(b) the lithium-air battery is subjected to discharge until the specific capacity reaches a value X;

(c) the lithium-air battery is recharged;

(d) steps (b) and (c) are repeated.

In passing, it may be mentioned that in the case where $Li_2O_2$ or $Li_2O$ is contained in the cathode, a possibility mentioned hereinabove, the lithium-air battery as prepared will not initially be provided in a fully charged state, so that at least the first time the battery is used, cycling may not begin at step (a) as indicated above.

The specific capacity value X selected may vary widely and, for example, be situated in the range of 200 to 10000 mAh/g (here expressed with respect to grammes (g) of particulate carbon). The specific capacity of a lithium-air battery may be determined by discharging up until 2 V. It may be appropriate during operation of the battery to cycle the battery within limits that do not go to full discharge or charge. It may be advantageous to cycle the battery between 10% to 90% of its specific capacity (determined in step(b)), preferentially 20% to 80%, more preferably 20% to 70%. Cycling may also be carried out between certain limits of initial or maximum theoretical discharge capacity. Capacity-limited cycling may enable the cell to survive longer, and it may thus be appropriate to limit the cycling capacity to around 50% of the full discharge capacity.

Any combination of the above described elements in all possible variations thereof is encompassed by the invention unless otherwise indicated herein or otherwise clearly contradicted by context. Thus, all features and embodiments described herein in particular as applicable, advantageous or preferred in the context of the invention are to be construed as being applicable in combination with one another, in preferred embodiments of the invention.

EXAMPLES

The following experimental examples are illustrative and enable the functioning of the invention to be understood. The scope of the invention is not limited to the specific embodiments described hereinafter.

Example 1

Example 1A

Preparation of Air Cathodes Supported on Carbon Foam

Below is a summary of the procedure for preparing carbon foam on which particulate carbon is supported according to the invention:

1. Weigh out $MnO_2$ (0.250 g); Put it into a mortar; Add 5 drops of anhydrous acetone; Grind $MnO_2$ 2. Weigh out Super P (0.420 g); Add it into the same mortar; Add 10 drops of anhydrous acetone; Grind all together 3. Weigh out binder Pvdf (Kynar) (0.330 g); Add it into the mortar; Grind all together for few minutes 4. Introduce the ground resulting powder into the Thinky Mixer® pot mixer (Other mixing methods are possible), and add 7.5 g of anhydrous acetone 5. Mix for 5 min at 1500 rpm. Repeat this operation 5 times (=30 min in total)

6. Weigh the empty carbon foam disks (here a 12 mm diameter and 6 mm thickness was used)

7. Drop the carbon foam disks into the slurry for 30 seconds

8. Recover the carbon foam disks and let the acetone evaporate. The carbon foam disks dry after 10 minutes in air at ambient temperature 9. Dry the carbon foam disks in air 1 hour at 80° C.

10. Weigh the carbon foam disks containing dried slurry

11. Dry the carbon foam disks impregnated with slurry 12 h under vacuum at 80° C.

Example 1B

Procedure for Preparation of Li—$O_2$ Cell

Having obtained dry carbon foam disks through the procedure set out above, a lithium air battery may then be assembled using the following steps:

12. Transfer the dried disk cathodes into the glove box

13. Assembly of cell into the glove box

Cut a disk of 10 mm diameter of lithium metal (anode or negative electrode)

Deposit this Li disk on the anode current collector

Add 2 layers of separator (here Glass fiber separators)

Add electrolyte (0.75 mL)

Add cathode

Add electrolyte (0.75 mL)

Add current collector tube

Introduce the cell into a sealed container.

14. Cell taken out of Glove Box & filled with pure $O_2$ (Grade 5) for 10 min

15. Cell connected to Cycling Machine (VMP3 Biologic); Cycling or Rate test

In the case of preparation of cathodes/slurry not containing catalyst, one may skip step 1. The other steps remain unchanged. The amounts are then 0.330 g binder and 0.670 g carbon.

Comparative Example 1

Air Cathode Supported on Carbon Paper

Below is a summary of a carbon paper supported cathode & Li—$O_2$ cell preparation procedure:

1. Weigh out $MnO_2$ (0.250 g). Put it into a mortar; Add 5 drops of anhydrous acetone; Grind $MnO_2$ 2. Weigh out Super P (0.420 g); Add it into the same mortar; Add 10 drops of anhydrous acetone; Grind all together 3. Weigh out binder Pvdf (Kynar) (0.330 g); Add it into the mortar; Grind all together for few minutes 4. Introduce the ground resulting powder into the Thinky Mixer® pot. Add 7.5 g of anhydrous acetone 5. Mix for 5 min at 1500 rpm. Repeat this operation 5 times (=30 min in total)

6. Prepare a carbon paper sheet of 15 cm×8 cm

7. Coat the slurry onto the carbon paper sheet using the Dr Blade technique.

8. Let the acetone evaporate. Carbon paper/slurry is dried after 10 minutes in air at ambient temperature 9. Dry the slurry/carbon paper in air 1 h at 80° C.

10. Cut 12 mm diameter disk from the slurry/carbon paper. Weigh carbon foam disks containing dried slurry.

11. Dry disk carbon papers impregnated with slurry 12 h under vacuum at 80° C.

12. Transfer the dried disk cathodes into the Glove Box

13. Assembly of cell into the Glove Box

Cut a disk of 10 mm diameter of lithium metal (anode or negative electrode)

Deposit this Li disk on the anode current collector

Add 2 layers of separator (here glass fiber separators)

Add electrolyte (0.75 mL)

Add cathode

Add current collector tube

Introduce the cell into a sealed container.

14. Cell taken out of Glove Box & filled with pure $O_2$ (Grade 5) for 10 min

15. Cell connected to Cycling Machine (VMP3 Biologic); Cycling or Rate tests (1) or (2)

In the case of preparation of cathodes/slurry not containing catalyst, skip step 1. The other steps remain unchanged. The amounts are then 0.330 g binder and 0.670 g carbon.

Electrochemical Tests

Cycling:

Step 0: The cell is held in open circuit voltage for 3 h.

Step 1: The cell is discharged until 2V at a current of −25 μA or −100 μA.

Step 2: The cell is held in open circuit voltage for 30 minutes.

Step 3: The cell is charged until 4.3V at +25 μA or +100 μA.

Rate Test (1)

Step 0: The cell is held in open circuit voltage for 3 h.

Steps n+1: The cell is discharged for 30 minutes at a current rate of −i applied (mA) until the value of 2V is reached. See value of −i applied (mA) on the graph.

Between each step, a rest period (open circuit voltage) of 1 second is applied.

Rate Test (2)

Step 0: The cell is held in open circuit voltage for 3 h.

Steps n+1 (n≥0): The cell is discharged for 15 minutes at a current of −(0.02+n*0.02) mA/cm² applied until the value of 2V is reached.

Between each step, a rest period (open circuit voltage) of 1 second is applied.

Results

FIG. 4 illustrates the problem no 4 encountered in metal-air non-aqueous batteries. It is the result of a test on Comparative Example 1. Voltage versus capacity of a Li—$O_2$ battery using a state of the art cathode current collector was studied (a carbon paper-based cathode). One battery was cycled at 25 μA (slow rate) and the other at 100 μA (faster rate).

Figure 6A:
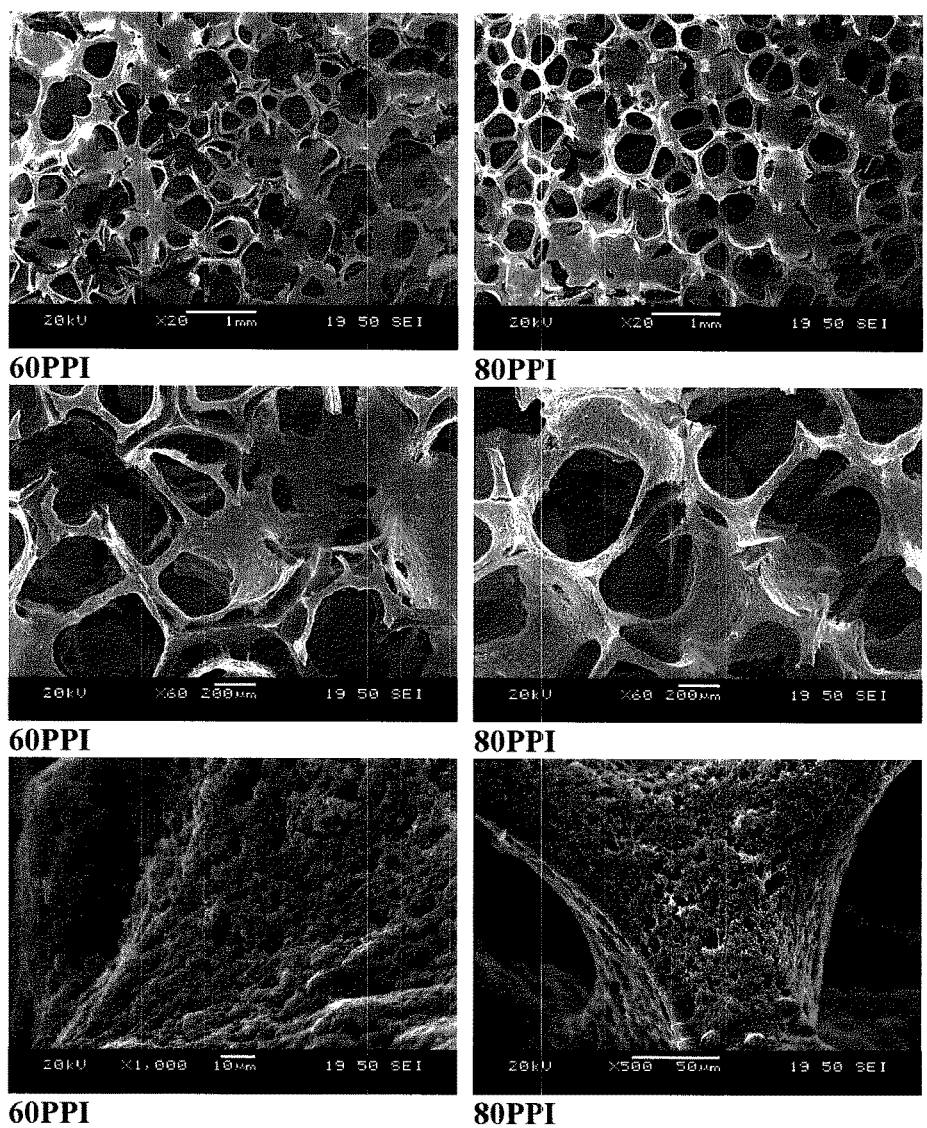
FIG. 6(a) shows Scanning Electron Microscope images of 60 ppi and 80 ppi carbon foam after the impregnation with slurry.
Figure 6B:
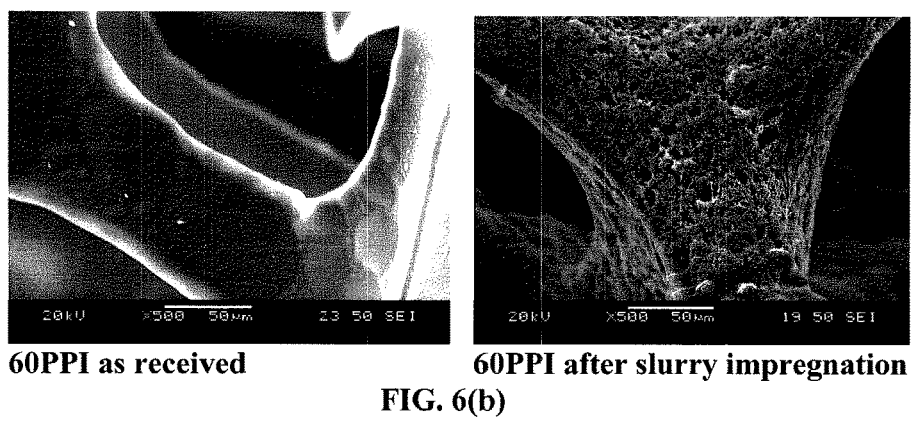
FIG. 6(b) shows Scanning Electron Microscope images of 60 ppi carbon foam before (left) and after (right) the impregnation process with slurry.

FIG. 6(a) shows that whatever the initial porosity of the carbon foam, the porosity is maintained after the impregnation process. FIG. 6(b) demonstrates that the skeleton of the carbon foam is largely covered with the slurry.

Figure 7:
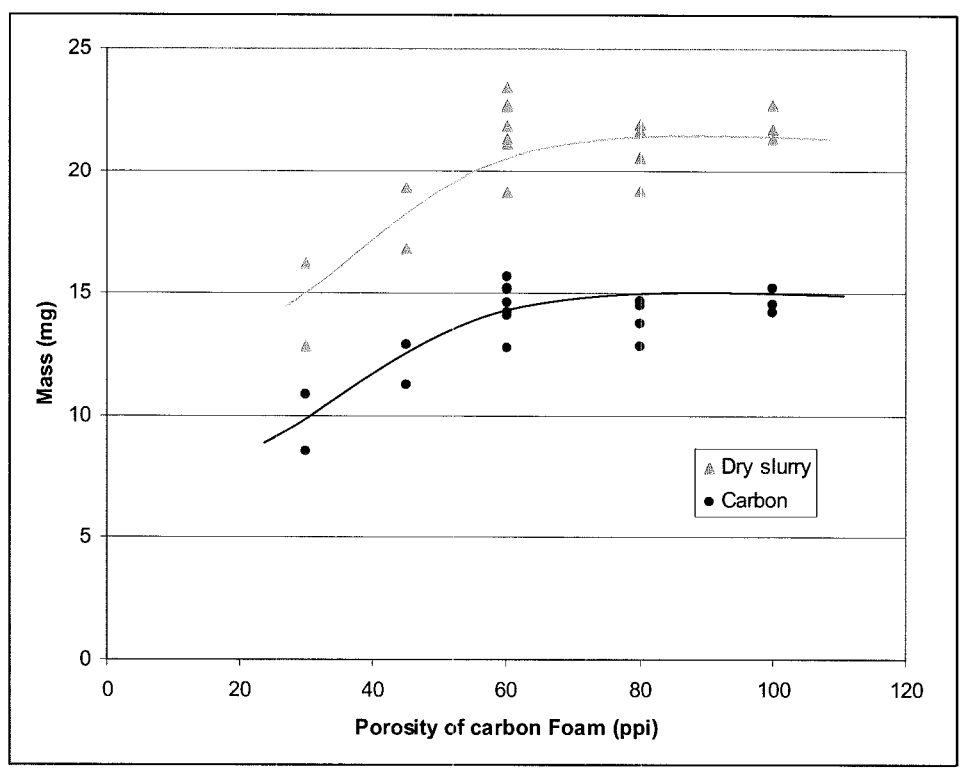
FIGS. 7 to 9 show studies of the mass of carbon, binder and catalyst incorporation into carbon foam that may be achieved during application of a preparation method of the present invention.

FIG. 7 shows the mass of dry slurry and carbon impregnated/deposited on carbon foam of various porosities (expressed in ppi, i.e. pores per inch). In each case, the foam was a disk of 12 mm diameter and 6 mm thickness. In this case, the slurry is composed of Carbon (Super P) & binder (Kynar).

Figure 8:
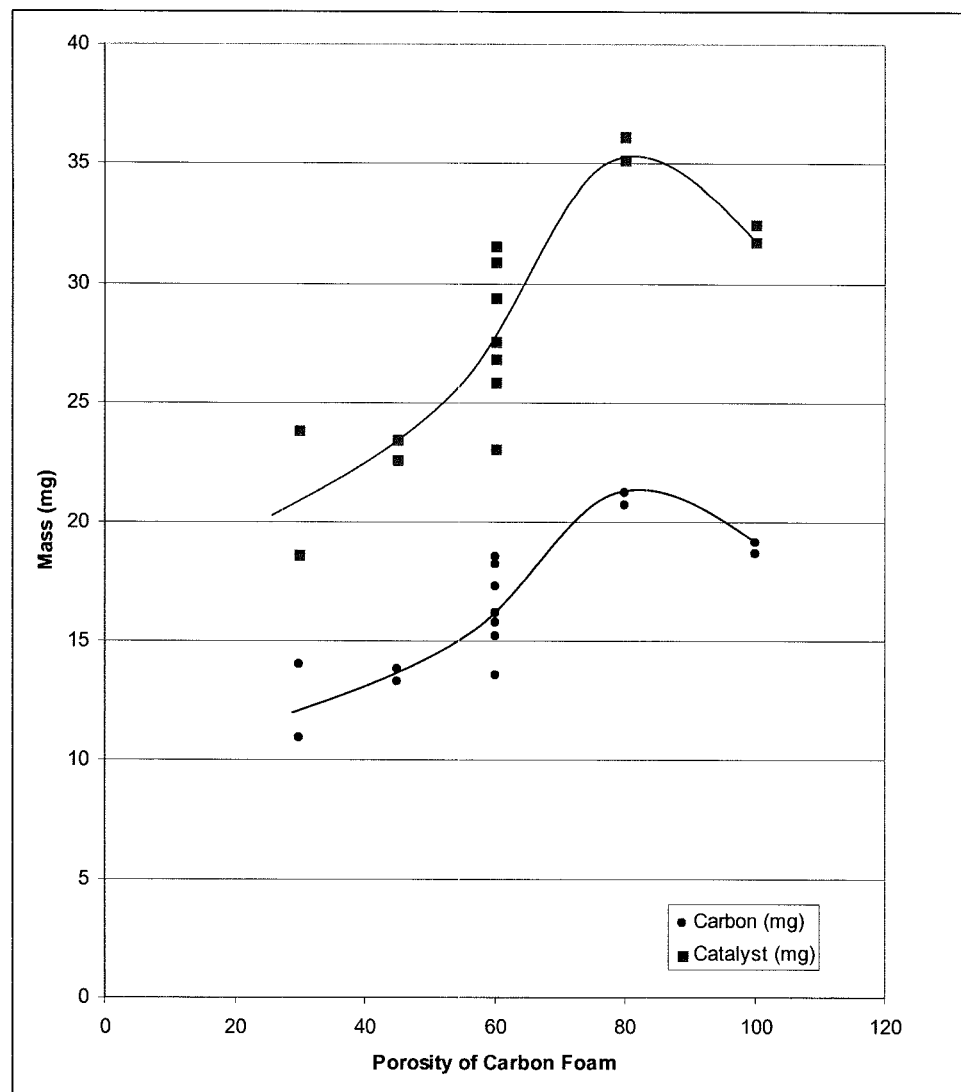

FIG. 8 shows the mass of carbon impregnated/deposited on carbon foam of various porosities (expressed in ppi, i.e. pores per inch). In each case, the foam was a disk of 12 mm diameter and 6 mm thickness. In this case, the slurry is composed of carbon (Super P): binder (Kynar): catalyst ($MnO_2$).

Figure 9:
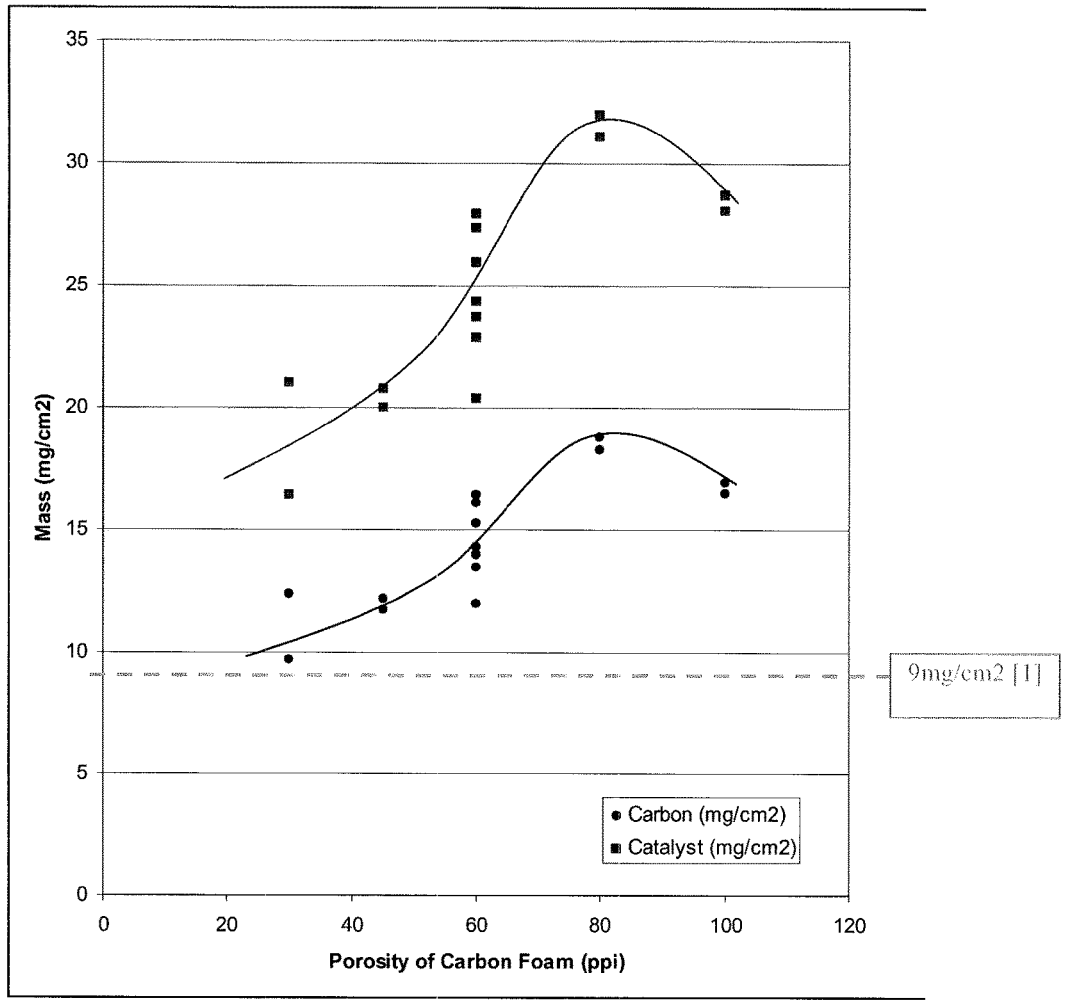

FIG. 9 shows the mass of carbon impregnated/deposited on carbon foam of various porosities (expressed in ppi, i.e. pores per inch). In each case, the foam was a disk of 12 mm diameter and 6 mm thickness.

Figure 10:
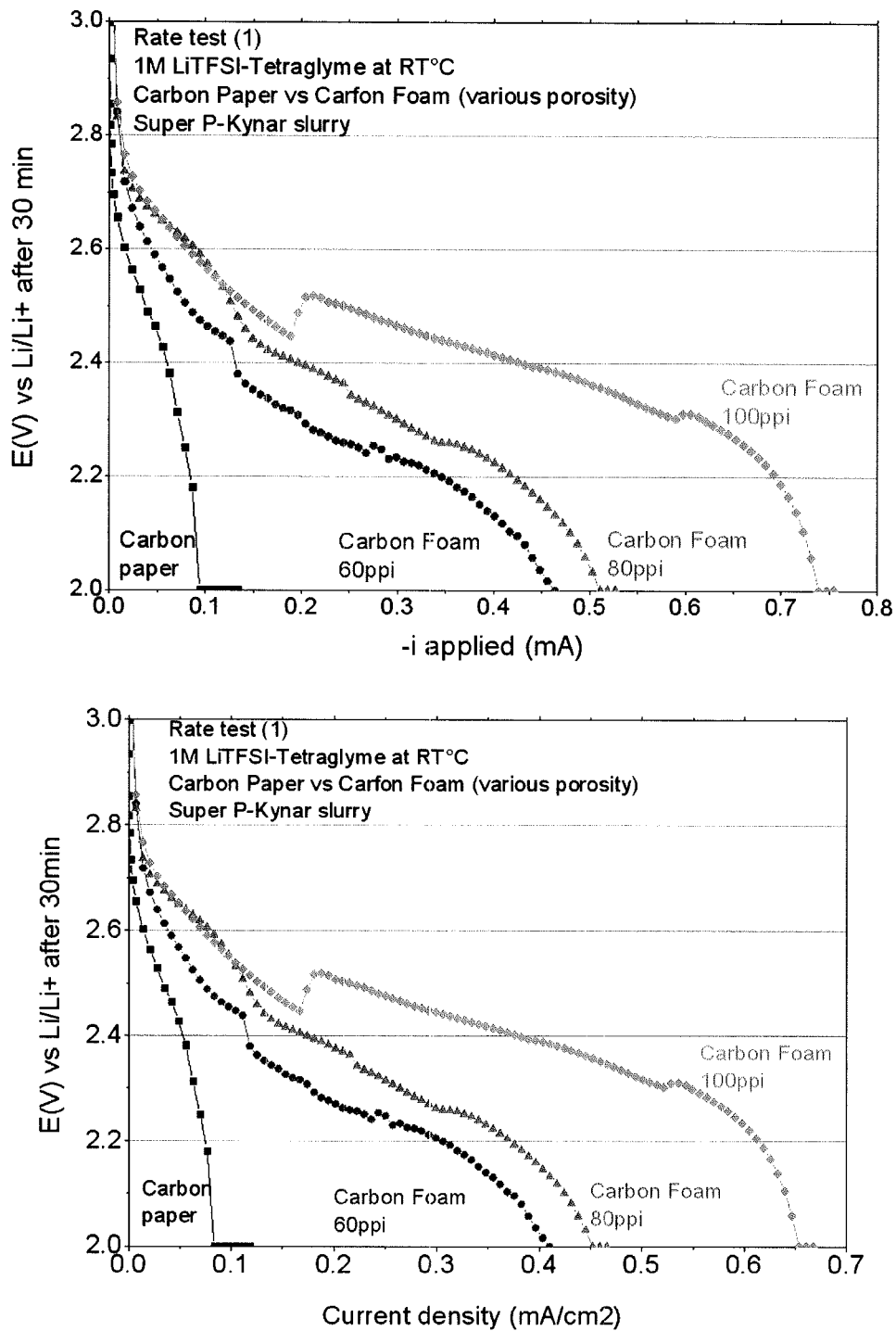
FIGS. 10 to 14 show the results of studies of rate tests, cycling and discharge performance for lithium-air batteries according to the present invention using particulate carbon supported on carbon foam, compared with the performance of conventional lithium-air batteries using a positive electrode containing particulate carbon supported on carbon paper.

FIG. 10 shows rate test (1) performed at room temperature on Li—$O_2$ cell in 1M LiTFSI-Tetraglyme electrolyte. Here the potential E(V) of the Li—$O_2$ cell after 30 min of discharge is represented as a function of the absolute value of the current applied (mA) (top figure) or as a function of the current density ($mA/cm^2$) (lower figure). The slurry is Super P-Pvdf deposited onto Carbon paper (comparative example 1) or onto Carbon Foam of various porosities (60 ppi, 80 ppi or 100 ppi).

Figure 11:
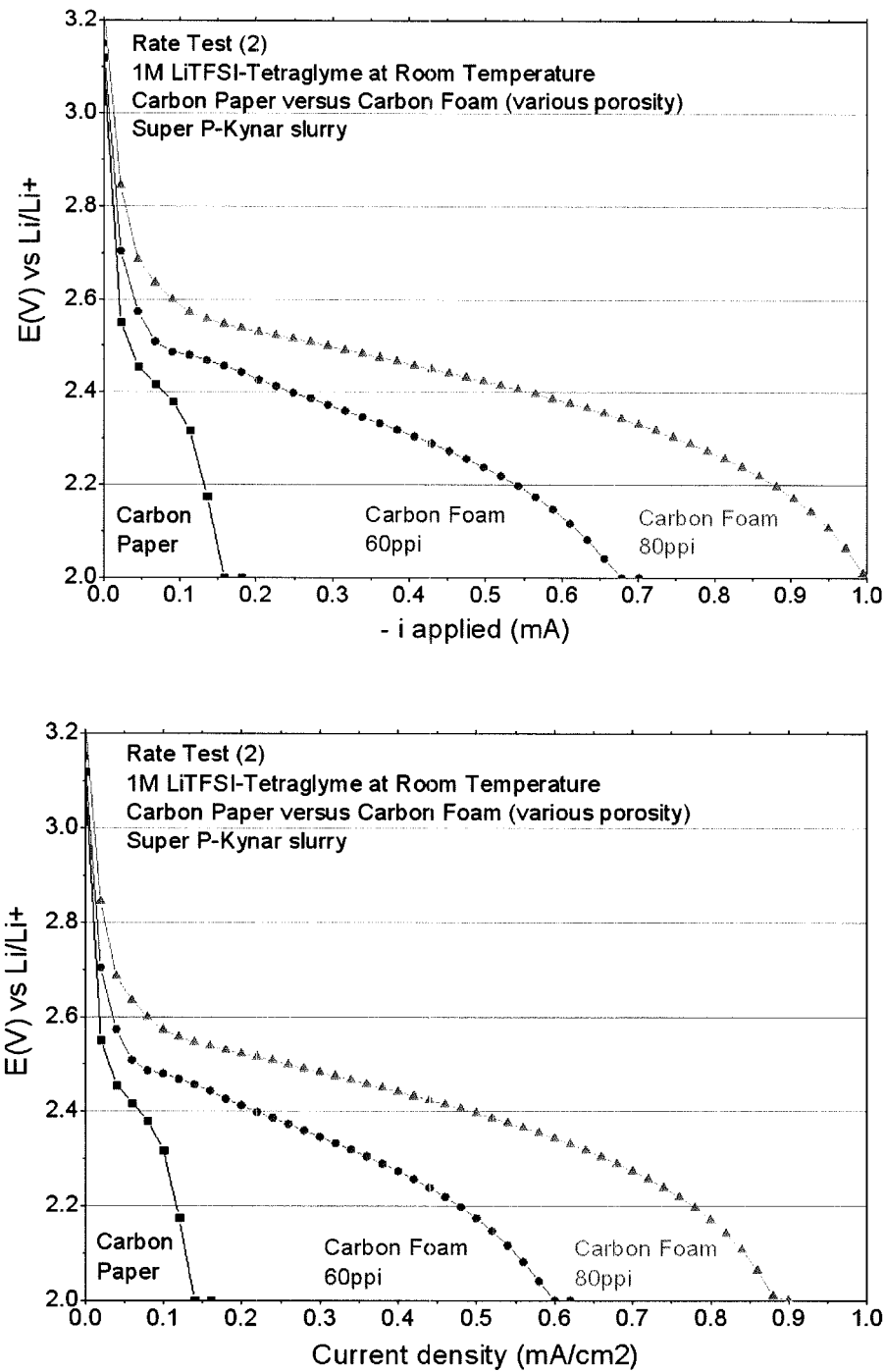

FIG. 11 shows rate test (2) performed at room temperature on Li—$O_2$ cell in 1M LiTFSI-Tetraglyme electrolyte. We represent here the potential E(V) of the Li—$O_2$ cell after 15 min of discharge as a function of the absolute value of the current applied (mA) (lower fig) or as a function of the current density ($mA/cm^2$) (top figure). The slurry is Super P-Pvdf deposited onto carbon paper (Comparative Example 1) or onto carbon foam of various porosities (60 ppi, 80 ppi).

FIG. 12 shows cycling performances at room temperature of Li—$O_2$ cell in 1M LiTFSI-Tetraglyme electrolyte at a current of +/−100 µA between 2V-4.3V. The slurry (Super P-Pvdf) is deposited onto carbon paper (Comparative Example 1) or onto carbon foam (60 ppi). Potential E(V) is represented as a function of absolute capacity (mAh) (top figure) or as a function of specific capacity (mAh/g-Carbon) (lower figure)

Figure 13:
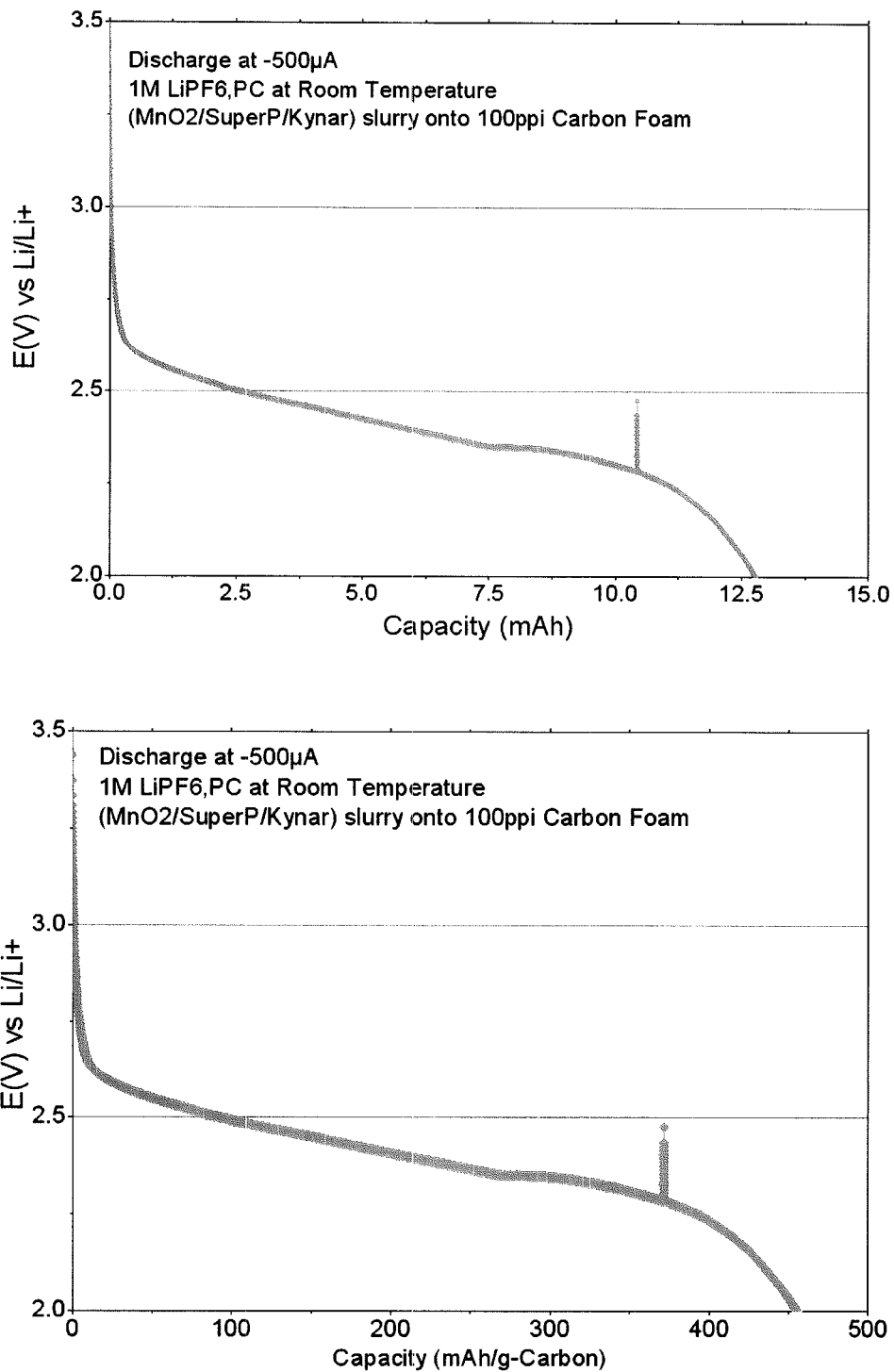

FIG. 13 shows discharge performances at room temperature of Li—$O_2$ cell in 1M $LiPF_6$-propylene carbonate at −500 µA until 2V. The slurry (Super P-Pvdf-$MnO_2$) is deposited onto carbon foam (100 ppi). Potential E(V) is represented as a function of absolute capacity (mAh) (top figure) or as a function of specific capacity (mAh/g-Carbon) (lower figure). It may be observed that if the same current (−500 µA) is applied to a carbon paper based cathode, the voltage drops directly to 2V.

FIG. 14 shows cycling performances at room temperature of Li—$O_2$ cell in 1M $LiPF_6$-Propylene Carbonate electrolyte at a current of +/−100 µA between 2V-4.3V. The slurry (Super P-Pvdf-$MnO_2$) is deposited onto carbon paper (Comparative Example 1) or onto carbon foam (100 ppi). Potential E(V) represented as a function of absolute capacity (mAh) (top figure) or as a function of specific capacity (mAh/g-Carbon) (lower Fig).

The invention claimed is:

1. A metal-air battery comprising:
   a negative electrode containing a negative-electrode active material;
   a positive electrode using oxygen as a positive-electrode active material; and
   an electrolyte medium arranged between the negative electrode and the positive electrode;
   wherein:
   the positive electrode contains carbon foam impregnated with particulate carbon,
   the amount of particulate carbon expressed with respect to the volume of carbon foam is between 5 and 25 mg particulate carbon/$cm^3$ of carbon foam,
   the particulate carbon has a specific surface area of between 20 and 2000 $m^2$/g and an average primary particle diameter in a range of from 8 to 350 nm, and
   the electrolyte medium comprises a non-aqueous organic solvent.

2. The metal-air battery according to claim 1, wherein the carbon foam has a bulk density in a range of from 0.01 to 0.9 g/$cm^3$.

3. The metal-air battery according to claim 1, wherein the carbon foam has a porosity of at least 5 ppi.

4. The metal-air battery according to claim 1, wherein the amount of particulate carbon expressed with respect to the volume of carbon foam is between 10 and 25 mg particulate carbon/$cm^3$ of carbon foam.

5. The metal-air battery according to claim 1, wherein the positive electrode contains a catalyst selected from the group consisting of: transition metal oxides, mixed transition metal oxides, phthalocyanines, and metals.

6. The metal-air battery according to claim 1, wherein the positive electrode contains a binder selected from the group consisting of: polyethylene, polypropylene, styrene-butadiene rubber, carboxymethylcellulose sodium salt, ethylene-acrylic acid copolymers, and homopolymers and copolymers of fluorinated monomers including tetrafluoroethylene, pentafluoropropylene, hexafluoropropylene, vinylidene fluoride, chlorotrifluoroethylene, perfluoroalkyl vinyl ethers, and sulfonate group-terminated perfluorovinyl ethers.

7. The metal-air battery according to claim 1, wherein the positive electrode comprises:
   a positive electrode active layer containing carbon foam impregnated with particulate carbon; and
   a positive electrode current collector.

8. The metal-air battery according to claim 1, which is a lithium-air battery, sodium-air battery, magnesium-air battery, zinc-air battery, tin-air battery, or silicon-air battery.

9. The metal-air battery according to claim 8, which is a lithium-air battery.

10. The metal-air battery according to claim 1, wherein the positive electrode serves as a positive electrode current collector, and no separate positive electrode current collector is present in the metal-air battery.

* * * * *